Aug. 7, 1934.     W. M. BRADSHAW ET AL     1,969,499
UNIVERSAL DETACHABLE WATTHOUR METER MOUNTING
Filed Oct. 14, 1933     4 Sheets-Sheet 2
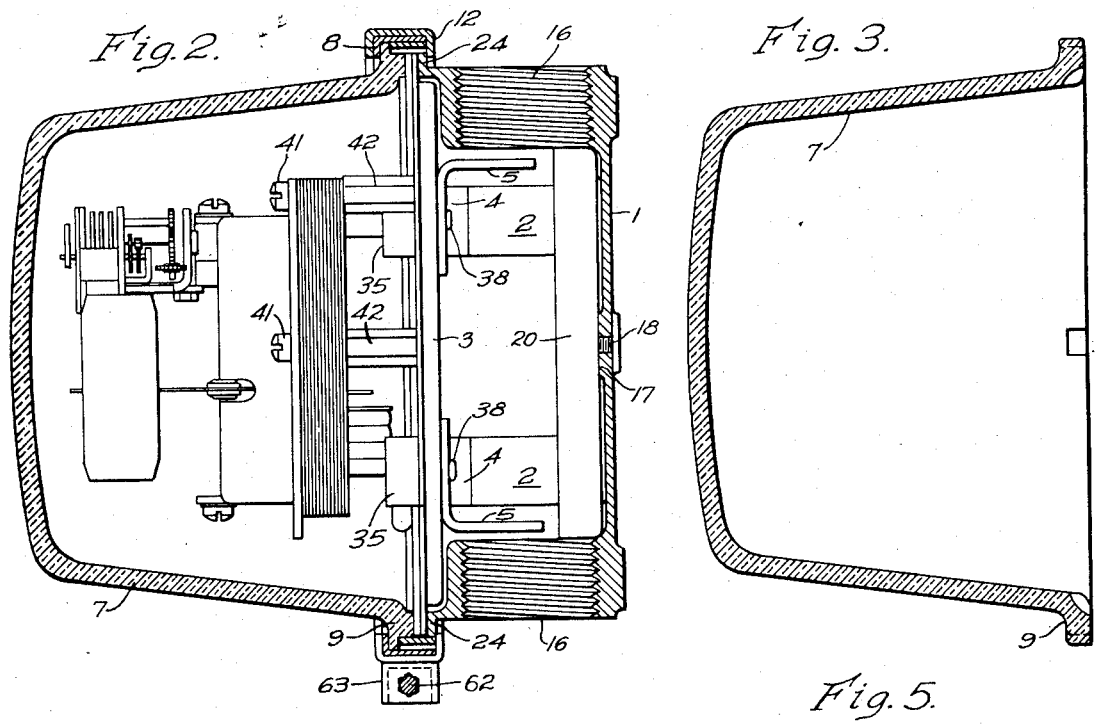
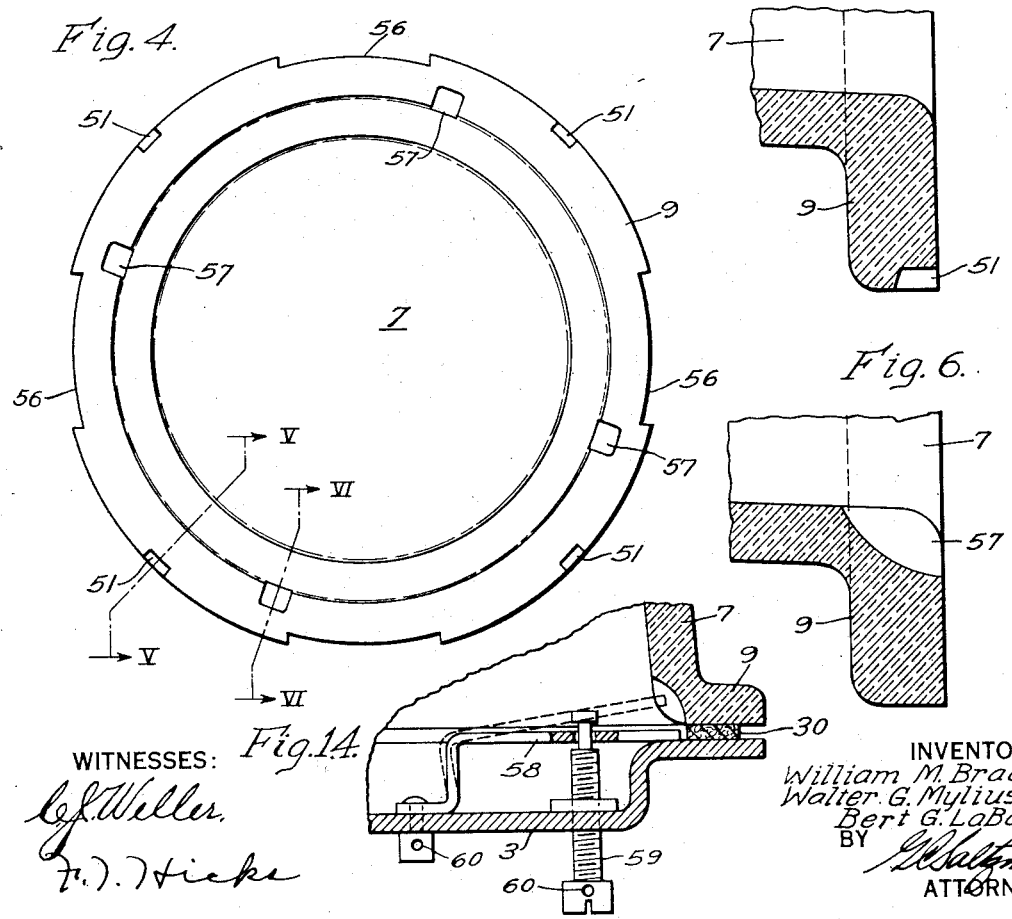

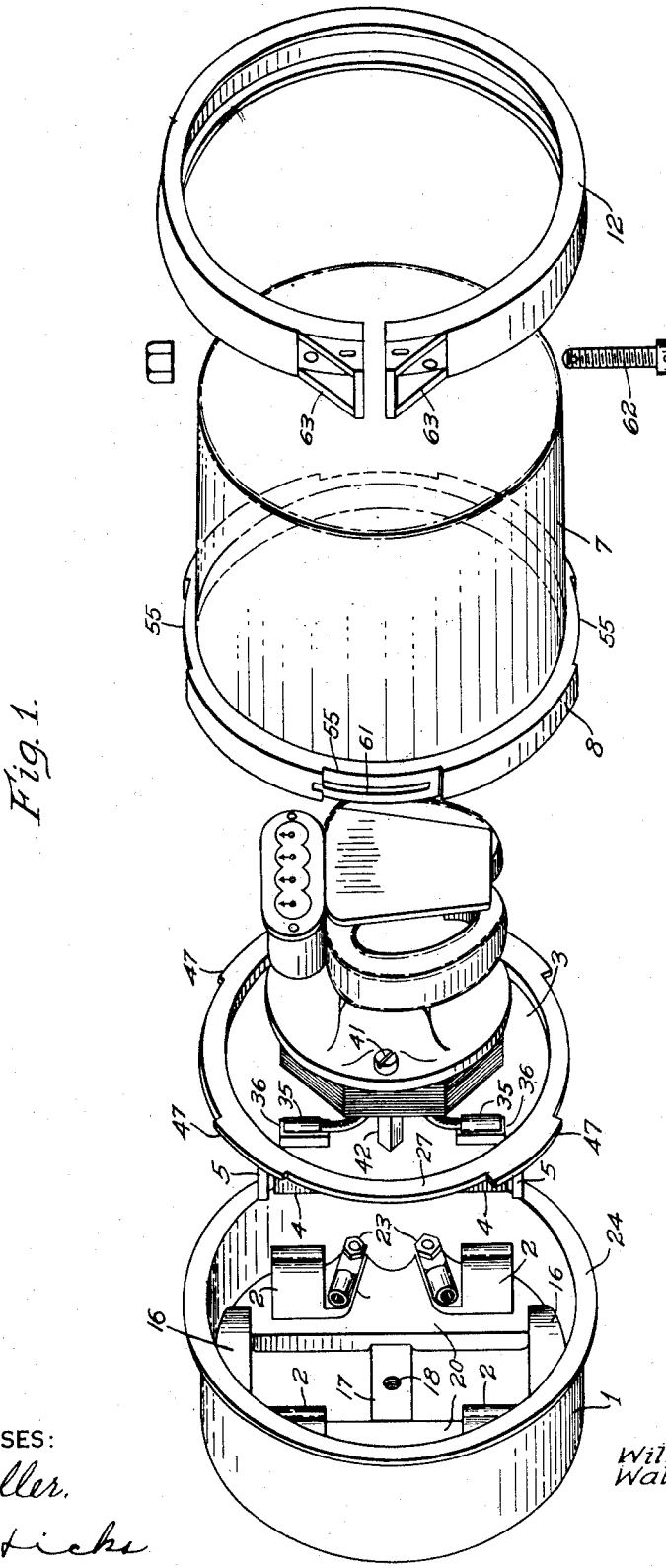

Aug. 7, 1934.   W. M. BRADSHAW ET AL   1,969,499
UNIVERSAL DETACHABLE WATTHOUR METER MOUNTING
Filed Oct. 14, 1933    4 Sheets-Sheet 3
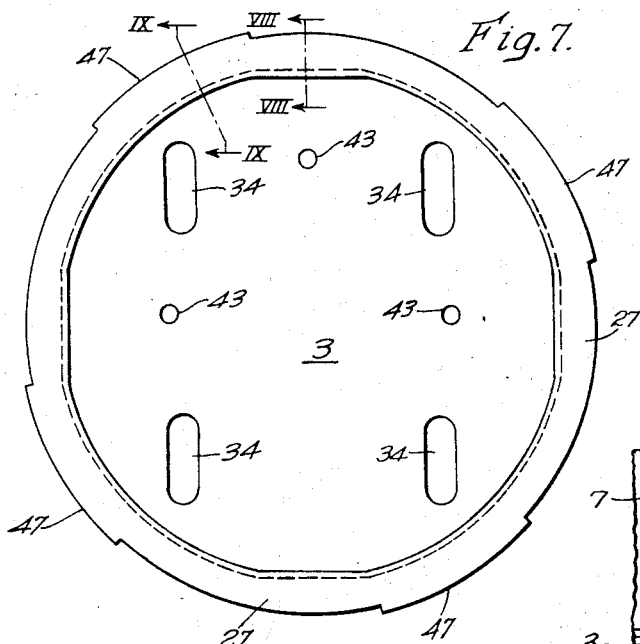
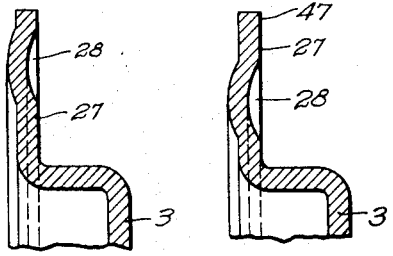
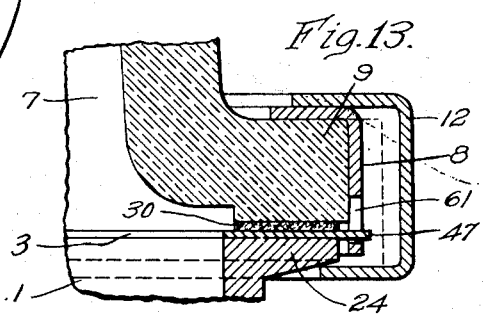
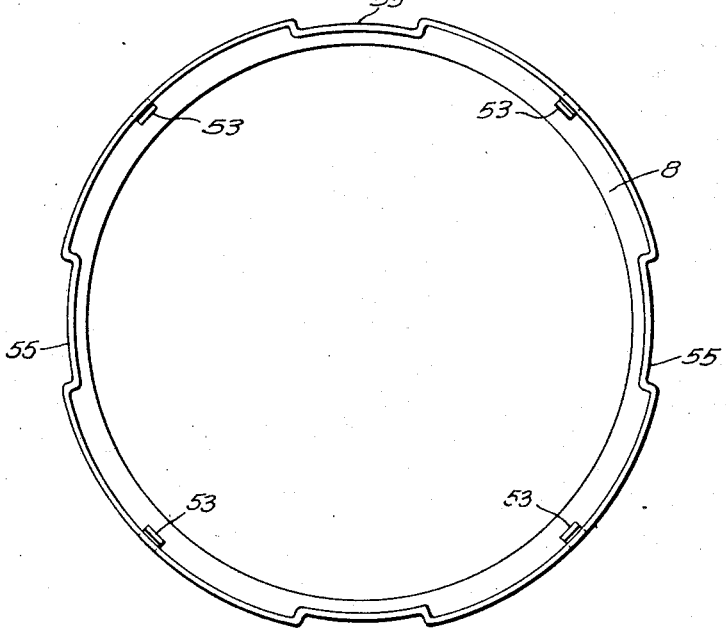
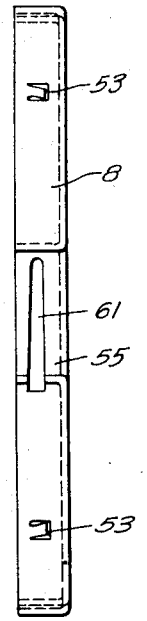
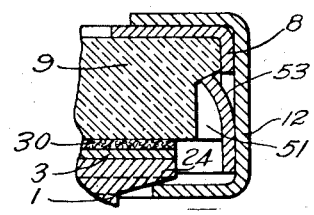
WITNESSES:
INVENTORS.
William M. Bradshaw,
Walter G. Mylius and
Bert G. LaBar.
BY
ATTORNEY

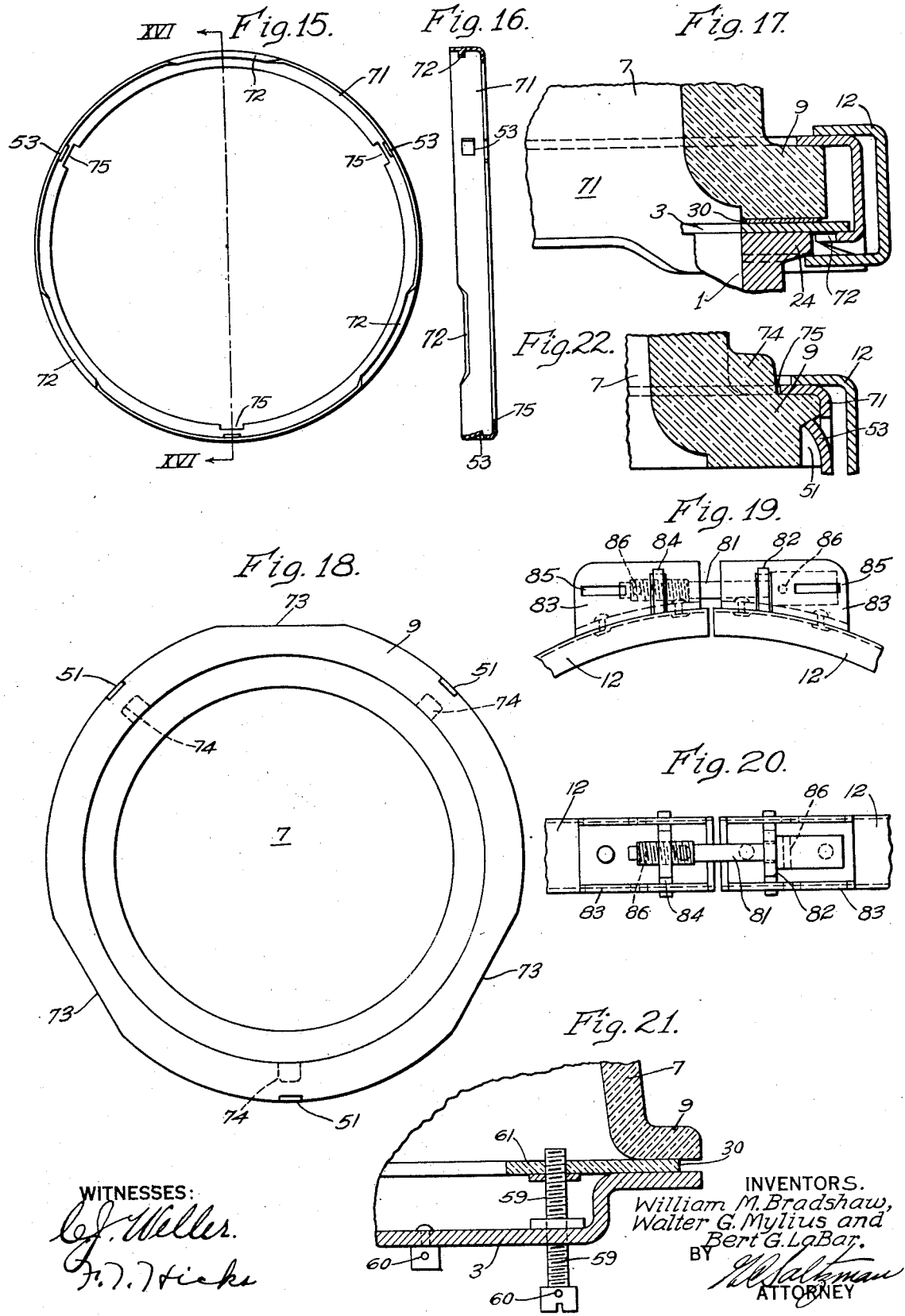

Patented Aug. 7, 1934

1,969,499

UNITED STATES PATENT OFFICE 1,969,499

UNIVERSAL DETACHABLE WATTHOUR METER MOUNTING

William M. Bradshaw and Walter G. Mylius, Summit, and Bert G. La Bar, Union, N. J., assignors to Westinghouse Electric & Manufacturing Company, East Pittsburgh, Pa., a corporation of Pennsylvania Application October 14, 1933, Serial No. 693,588

6 Claims. (Cl. 171—34)

Our invention pertains to mounting means for detachable watthour meters and more particularly to a universal mounting means whereon various different makes or styles of watthour or other meters, instruments, time switches, and the like, may be conveniently and interchangeably mounted.

In practice considerable inconvenience is experienced when it is necessary to remove a watthour meter for repairing or testing because such meters are quite permanently mounted and also because the mounting fixtures will not interchangeably receive other styles of meters. Furthermore, the usual mounting of watthour meters within the customer's building or enclosure causes a great loss of time to the meterman in his regular rounds, since he must always wait for admittance before he can enter and read or inspect the meter.

In a great number of cases the meterman will find the customer absent and he may have to return several times before he is successful in obtaining a reading which should normally require only a few seconds. The result is that by far the larger portion of the meterman's time is wasted in gaining access to the meter which time could be saved if the meter were mounted outside.

The inside meter seems also to be a great temptation to many people who deliberately divert energy by changing connections or by inserting a fine wire around the cover to interfere with the rotation of the meter disk. In this they are quite safe because they have ample opportunity to remove all evidence before permitting the meterman to enter. This difficulty may also be avoided by mounting the watthour meters outside of the building.

It is, accordingly, an object of our invention to provide means for conveniently mounting watthour meters and protecting them from adverse weather conditions in outside locations.

A further object of our invention is to provide a universal mounting means for detachable meters whereby different makes and styles of meters may be conveniently and interchangeably mounted thereon.

It is also an object of our invention to provide a detachable watthour meter mounting which is simple, convenient and practical.

It is a further object of our invention to provide a mounting for watthour meters which may be assembled into a unitary, dust proof structure which may be conveniently removed by an authorized person.

The invention itself, however, both as to its organization and its method of operation, together with additional objects and advantages thereof, will best be understood from the following description of specific embodiment, when read in conjunction with the accompanying drawings, in which:

Figure 1 is an exploded perspective view showing a detachable watthour meter in disengaged relation to one of our universal mounting devices;

Fig. 2 is a sectional view taken through the axis of the completely assembled meter and mount;

Fig. 3 is a sectional view of the glass cover member;

Fig. 4 is an elevational view showing the open end of the glass cover;

Figs. 5 and 6 are detail sectional views on lines V—V and VI—VI thereof respectively;

Fig. 7 is a plan view of a universal mounting plate to which a meter is secured for detachable mounting in our device;

Figs. 8 and 9 are detail sectional views on lines VIII—VIII and IX—IX thereof;

Fig. 10 is a plan view showing the cover rim which fits onto the flange of the glass cover;

Fig. 11 is an edge elevational view of the cover ring;

Fig. 12 is an enlarged sectional view taken through the flange of the glass cover after complete assembly of the device showing how the detent shown in Fig. 5 is engaged by a tooth reflected resiliently inward from the cover rim to hold the latter on the flange of the glass cover;

Fig. 13 is a similar view taken at a different circumferential position;

Fig. 14 is an enlarged sectional view showing the cover locking means on the base plate;

Fig. 15 is an elevational view showing a modified cover rim;

Fig. 16 is a sectional view thereof on line XVI—XVI;

Fig. 17 is an enlarged sectional view taken radially through the flange of the glass cover showing the relation of the modified rim in the complete assembly;

Fig. 18 is an elevational view showing the open end of a modified glass cover;

Figs. 19 and 20 are elevation and plan views showing a modified fastener for drawing the sealing ring in clamping relation around the edges of the glass cover and the conduit outlet casing;

Fig. 21 is a sectional view showing a modification of the locking and sealing arrangement; and Fig. 22 is a detail sectional view taken through the edge of the modified glass cover with the associated rings thereon.

Referring more specifically to Fig. 1 of the drawings, it will be seen that our universal detachable meter mounting comprises a base or conduit outlet casing 1 of cylindrical formation, open at one end and provided with upturned split contacts 2 which are mounted on the closed end and permanently connected with the service conductors from the conduits. A universal meter base plate 3 is provided which is adapted to mount any type of meter on its upper surface and, as subsequently more fully set forth, it carries downwardly projecting contacts 4 which are conductively connected with the meter. The base plate is adapted to fit the open end of the outlet casing 1 and carries downwardly projecting guide fingers 5 which guide the contacts 4 to plug into the split contacts 2 in the casing.

Before the meter base plate is plugged into the outlet casing, a glass cover 7 is secured thereon to enclose the meter, and to protect it from dust and foreign matter. This is accomplished by means of a self-latching cover rim 8 which latches itself into the flange 9 of the cover, and which carries means for interlockably engaging lugs 47 which project from the edge of the base plate 3 in a manner to be subsequently set forth.

Thus any style of meter may be mounted upon our universal meter base plate 3 and with its cover 7 secured in place, it is a unit ready to be plugged into any outlet casing desired.

After the unit is plugged into an outlet casing, it is secured and sealed firmly in position, as shown in Fig. 2, by a flexible clamping ring 12, in a manner to be subsequently set forth.

The conduit outlet casing 1 is preferably a die casting of an aluminum alloy, and its shape is substantially that of a flattened cylinder. Threaded nipples 16 for receiving the ends of the conduit extend inwardly and are disposed in diametrically opposed relation in the cylindrical casing walls, as shown in Fig. 2. Various portions 17 of the closed end wall are provided with re-enforced areas through which orifices 18 extend to permit the insertion of mounting bolts, or screws, for fastening the casing to the wall of a building or other structure.

On each side of the area between the threaded conduit nipples 16 suitable blocks 20 of insulation are provided on the end wall of the casing 1 for supporting the split contact members 2 in upturned position. On each contact member 2 suitable fastening means 23 is provided for securing the conductor or the lugs soldered thereon. The edge of the open end of the outlet casing is provided with a laterally projecting flange 24.

The universal meter base plate 3 is preferably a circular sheet metal stamping provided with a rim 27 which extends laterally and is raised relatively to the central area of the plate 3, as shown more clearly in Figs. 7, 8 and 9. A portion of the rim is pressed upwardly to provide a convex area 28 extending completely around the rim to provide a high pressure contact line of engagement with a gasket 30 which is inserted between the rim 27 of the base plate and the flange 9 of the glass cover, when the latter is mounted thereon. The convex cross section formation of the rim 27 of the base plate 3 insures a tight, dust proof, connection with only a moderate clamping pressure on the glass rim. The central area of the base plate 3, being depressed relatively to its rim, sits down into the open end of the outlet casing 1, while the rim 27 rests upon the rim 24 of the casing.

In the central area of the base plate slots 34 are provided through which contact members 4 are extended. As shown in Figs. 1 and 2, one end of each contact member 4 is provided with a thick head 35 from which conductive connection is extended to any meter mounted upon the plate. The head 35 of each contact 4 rests upon a block of insulation 36 through which the thinner portion of the contact member 4 extends to the casing side of the plate where it passes through another insulating member 5 which is L-shaped. Each contact member secures its insulating members 36 and 5 into clamping engagement on opposite sides of the base plate 3 by means of a cotter pin 38 extending through the contact member 4 adjacent the casing side of the L-shaped insulating piece 5, as shown in Fig. 2.

The free end of each L-shaped member extends in parallel relation to each contact member 4 and serves as a guide finger to guide the contact members 4 into the split contact members 2 in the casing 1. A meter may be secured to the base plate 3 by bolts 41 having suitable spacing sleeves 42 thereon. Holes 43 are provided in the proper position on the base plate for receiving the bolts from the meters. The rim 27 of the base plate is provided with spaced lugs 47, which project only slightly beyond the periphery of the rim, for locking the glass cover into tight engagement with the base plate, as subsequently set forth.

The cover 7 is made of molded glass, and has a bowl like formation with a heavy flange 9, projecting laterally from its edges, as shown in Figs. 2, 3, 4 and 5. The outer periphery of the flange is provided with narrow spaced detent notches 51 which extend only partly across the edge of the flange 9 as shown quite clearly in Fig. 5. The notches 51 are provided to hold a self-latching cover ring 8, shown in Figs. 10 and 11. The cover ring 8 is pressed out of sheet metal and is provided with resilient prongs 53 which are bent inwardly.

When the ring 8 is placed in concentric relation over the cover and is forced down over the flange 9 thereof, in proper aligned position, the resilient prongs 53 snap into the detent notches 51 and the ring cannot be removed except by first applying a proper tool to force the prongs outwardly. One of the prongs is clearly shown in Fig. 12 in its latched position in a detent in the glass flange. To ensure that the ring 8 is pressed over the flange 9 in proper aligned position, the ring is provided with several wide depressed areas 55 which must be inserted in corresponding portions 56 provided in the glass flange 9 before the rim can be pressed down over the flange. The inner surface of the edge of the cover may be provided with detents 57 for engageably receiving the end of a resilient locking strip 58 mounted on the base plate 3 to prevent relative rotation of the cover.

The cover rim 8 protects the edge of the glass flange 9 and also serves to lock it onto the base plate 3. For this purpose each depressed area 55 in the ring is provided with a slot 61 which, as shown in Fig. 11, is inclined at an angle to the edge of the rim. The diameter of the ring 8 across the depressed portions 55 is less than the diameter of the base plate 3 across its laterally projecting lugs 47.

After placing the cover 7 on the base plate 3 so that the longer diameter of the cover rim 8 is adjacent the lugs 47 on the base plate, the cover is then rotated to turn the wide end of the slot 61 in each depressed area 55 in the ring toward one of the base plate lugs 47. As the lug 47 enters the slot 61 continued rotation causes the inclined slot to draw the lugs 47 and hence the base plate 3 in firm engaging relation, as shown in Fig. 13. The gasket 30 of yieldable material between the flange 9 and the convex surface on the base plate rim 27 serves to establish a tight seal.

By turning the screw 59 in the base plate 3, as shown in Fig. 14, and projecting the resilient lock strip 58 into the inner slot 57 in the cover, as shown by the dotted lines, the cover may be locked against further rotation. When the screw 59 has been turned to locking position, it may be secured against unauthorized manipulation by passing a wire through the holes 60 and sealing in the usual manner. It is also within the scope of our invention to omit the resilient tongue 58 and to extend the end of the screw 59 directly through an extension 61 projecting in from the gasket 30, as in Fig. 21. This prevents rotation of the gasket which may be provided with a layer of adhesive material on the upper surface to prevent relative rotation of the cover and also to ensure a tight joint.

The meter when secured to its base plate, with its cover clamped and sealed in position is ready for detachable service. It cannot be opened by unauthorized persons and it may be conveniently plugged into various outlet casings.

As the detachable unit is plugged into an outlet casing the guide fingers 5 guide the contact member into the split contacts 2 therein. By means of a bolt 62 extending through suitable angle members 63, the flexible clamping ring 12 is finally clamped in position with its radial flanges extending around the flange 9 of the meter cover and the rim 24 of the outlet casing 1 thereby holding them in proper engagement. The clamping ring is sealed by passing a wire through the holes in the bolt and the slots in the angle pieces and sealing the ends of the wire in the well known manner.

A modified form of the cover rim 71 is made of sheet material, as in the first embodiment but, as shown in Figs. 15, 16 and 17, it is substantially circular. Resiliently, inwardly bent, prongs 53 are also provided around the rim for holding it on the flange 9 of the glass cover 7 by interlocking engagement in detent notches 51 in the edge of the flange, as in the first embodiment. Spaced inwardly bent, guides 72 are provided at intervals around the lower edge of the rim 71 by crimping the edge of the sheet metal inwardly. These guides are crimped so that they are slightly inclined relative to the plane of the rim, as may be seen in Fig. 16. The flange 9 of the glass cover 7 is provided with flattened or segmented portions 73, shown in Fig. 18, which when assembled are adjacent the portions of the rim which are crimped over after the rim is forced into its position on the cover. The glass cover flange 9 is also provided with external lugs 74 which are adjacent the inwardly directed detent notches 51, and, as shown in Fig. 22 are received in suitable notches 75 in the inner edge of the rim 71 thereby preventing relative rotation while also reenforcing the glass flange where it is weakened by the detent notches 51.

After latching the rim in place on the cover flange, the cover is placed on the base plate 3 with the crimped guides 72 spaced between the lugs 47 which project laterally from the edge of the base plate. By rotating the cover, each of the inclined crimped guides 72 on the lower edge of its rim is turned into wedging engagement with an adjacent base plate lug 47. Continued rotation of the cover causes the inclined guides to firmly engage the lower surfaces of the lugs and the cover is clamped firmly onto the base plate. The gasket 30 between the base plate and the cover ensures a tight joint. After properly setting the means provided for locking and sealing the base plate 3 and cover 7 together in assembled relation, the assembly may be plugged into an outlet casing and sealed firmly thereto by means of a flexible sealing ring 12, as previously set forth.

A preferred form of sealing ring fastener, shown in Figs. 19 and 20, comprises a threaded bolt 81 which rotates freely in a bearing plate 82 loosely supported in apertures in the side walls of a channel shaped end piece 83 which is riveted to one end of the flexible ring 12. A similar channel shaped end piece is secured to the other end of the flexible ring 12 and holds a loosely mounted plate 84 which is threaded to receive the end of the threaded bolt. Suitable slots 85 are provided in the end pieces 83 for the reception of a suitable wire which may be passed through holes 86 in the bolt 81 and sealed in the well known manner. The head of the sealing bolt 81 is preferably slotted to receive a screw driver for convenient assembling.

It will be seen that we have provided a universal detachable weatherproof outdoor mounting whereby various styles of watthour meters may be conveniently and interchangeably installed by an authorized person.

Although we have shown and described certain specific embodiments of our invention, we are fully aware that many modifications thereof are possible. Our invention, therefore, is not to be restricted except insofar as is necessitated by the prior art and by the scope of the appended claims.

We claim as our invention:

1. A universal detachable mounting for electrical measuring instruments comprising a universal base plate, means for securing a measuring mechanism thereon, contacts extending through said base plate, means for securing said contacts in insulated relation on said plate, a cover adapted to fit over said base plate and means on the edges of said cover and plate engageable in interlocking relation by a relative rotary movement between said cover and plate.

2. A universal mounting for electrical measuring instruments comprising a cylindrical conduit outlet casing closed at one end, a rim around the open end of said casing, split contacts, insulating means for supporting the same in upturned position on the closed end of said casing, a universal base plate adapted to fit over the open end of said casing for supporting a measuring mechanism, contacts extending through said base plate for electrical connection to said mechanism, and means for securing said contacts in insulated relation on said plate, a cover for said base plate having a flange embracing the peripheral edge of said plate, and means engaging the rim of said outlet casing and said flange for securing the elements in operative relation.

3. A universal mounting for detachable watthour meters comprising a cylindrical conduit outlet casing closed at one end, threaded diametrically opposed orifices for receiving conduit, split contacts mounted on insulating means on the closed end of said cylinder and turned upwardly toward the open end, a rim around the open edge of said cylinder, a universal meter base plate adapted to fit the open end of said casing, insulated contacts extending through said plate for entering said split contacts when said plate closes the open end of said casing, a glass meter cover, means on the rim thereof for locking said cover on said plate, and means for circumferentially engaging the rim on the casing and the flange on the cover to hold them in closely engaged relation.

4. A cover for an electrical instrument comprising a glass body portion having the conformation of a bowl, a flange projecting laterally around the edge thereof, detent means in the outer surface of the flange, a ring adapted to be concentrically disposed over said cover in snug fitting relation on said flange, and resilient inturned prongs on said ring for engaging said detent means to latch the ring on the flange.

5. A rim for protecting and fastening the flanged edge of a glass cover for an electrical instrument comprising a ring of sheet metal of L-shaped cross section having an inturned flange for abutting the annular surface of the cover flange, a cylindrical outer wall for concentrically fitting and surrounding the peripheral outer surface of the flange, and resilient prongs pressed inwardly from the cylindrical wall of said rim to wedge into detent means in the peripheral outer surface of said flange to secure the rim thereon.

6. The combination with a glass cover for an electrical instrument having a laterally extending flange around the open edge with detent notches in the outer surface thereof, of a protective fastening rim comprising a ring of sheet metal of L-shaped cross section having an inturned flange for abutting the annular surface of said flange, and a cylindrical outer wall for concentrically fitting and surrounding the peripheral surface of said flange, resilient prongs pressed inwardly from the cylindrical wall of said rim to wedge into the detent notches in the outer surface of said flange, a base plate having laterally projecting lugs, and inclined guides provided at spaced intervals around the edge of said rim whereby said cover may be rotatively interlocked and clamped on said base plate.

WILLIAM M. BRADSHAW.
WALTER G. MYLIUS.
BERT G. La BAR.